United States Patent [19] [11] 3,932,958
Kistler, Jr. et al. [45] Jan. 20, 1976

[54] PLANT SHELTER

[75] Inventors: John J. Kistler, Jr.; William E. Chappell, both of Grand Haven; Frank J. Brechting, Jr., Spring Lake, all of Mich.

[73] Assignee: John Kistler & Associates, Inc., Grand Haven, Mich.

[22] Filed: Oct. 11, 1973

[21] Appl. No.: 405,702

[52] U.S. Cl. .............................. 47/26; 47/28; 52/83; 248/353
[51] Int. Cl.² ................ A01G 13/00; A01G 13/02; E04B 7/14
[58] Field of Search .......................... 47/26–31, 17, 47/19, 20–22, 44–46; 256/12.5; 248/353; 52/63, 83, 222

[56] References Cited
UNITED STATES PATENTS

| 68,475 | 9/1867 | Whitney | 47/45 |
|---|---|---|---|
| 118,348 | 8/1871 | Custer | 47/45 |
| 193,969 | 8/1877 | Laprade | 47/46 |
| 657,966 | 9/1900 | Stewart | 47/20 |
| 727,541 | 5/1903 | Hayes | 47/28 |
| 1,035,706 | 8/1912 | Hunt | 248/353 |
| 1,106,624 | 8/1914 | Cadwallader et al. | 47/20 |
| 1,732,627 | 10/1929 | Wilson | 248/353 |
| 2,143,659 | 1/1939 | Morrison | 47/28 |
| 2,741,874 | 4/1956 | Denning | 47/28 |
| 3,140,563 | 7/1964 | Allen | 47/20 |
| 3,381,424 | 5/1968 | Butler | 52/83 |
| 3,585,755 | 6/1971 | Thomas | 47/45 |
| 3,643,391 | 2/1972 | Mollinger | 52/222 X |

FOREIGN PATENTS OR APPLICATIONS

| 599,025 | 10/1959 | Italy | 47/17 |
|---|---|---|---|
| 677,916 | 12/1964 | Italy | 47/31 |
| 563,865 | 12/1923 | France | 47/17 |
| 800,208 | 6/1936 | France | 47/29 |

Primary Examiner—Edgar S. Burr
Assistant Examiner—Steven A. Bratlie
Attorney, Agent, or Firm—Woodhams, Blanchard and Flynn

[57] ABSTRACT

A plurality of posts are mounted upright from a supporting surface and arranged in longitudinally and transversely aligned rows to form a series of adjacent rectangles. A plurality of parallel and substantially uniformly spaced wires extend longitudinally of said posts and are connected to the upper ends of the longitudinally aligned posts, the opposite ends of said longitudinal wires being anchored at said supporting surface. A plurality of parallel and uniformly spaced transverse wires are connected between each pair of adjacent longitudinal wires at uniform intervals therealong, which intervals are only a fraction of the distance between the adjacent longitudinal wires, said transverse wires being substantially coplanar. A plurality of elongated, spaced and parallel elements are connected by flexible means so that said elements can be stored in a roll which can be mounted upon and then unrolled along a pair of said transverse wires between a pair of longitudinal wires. By this means, the amount of light reaching said surface surrounded by rectangles can be controlled.

2 Claims, 7 Drawing Figures

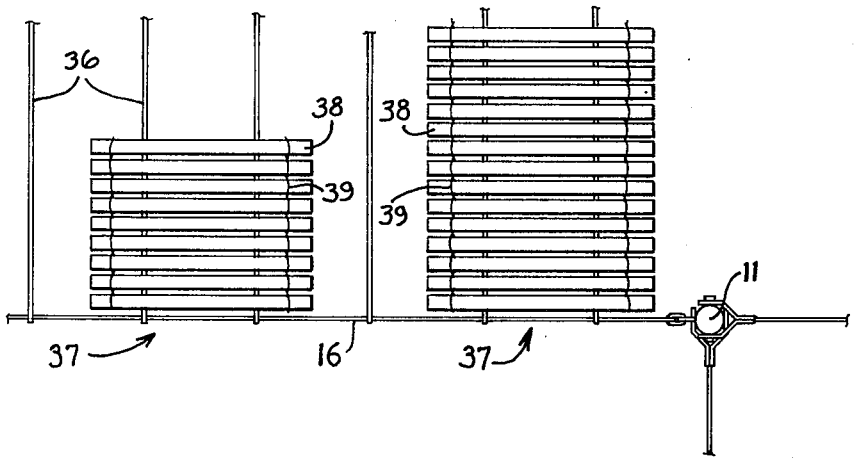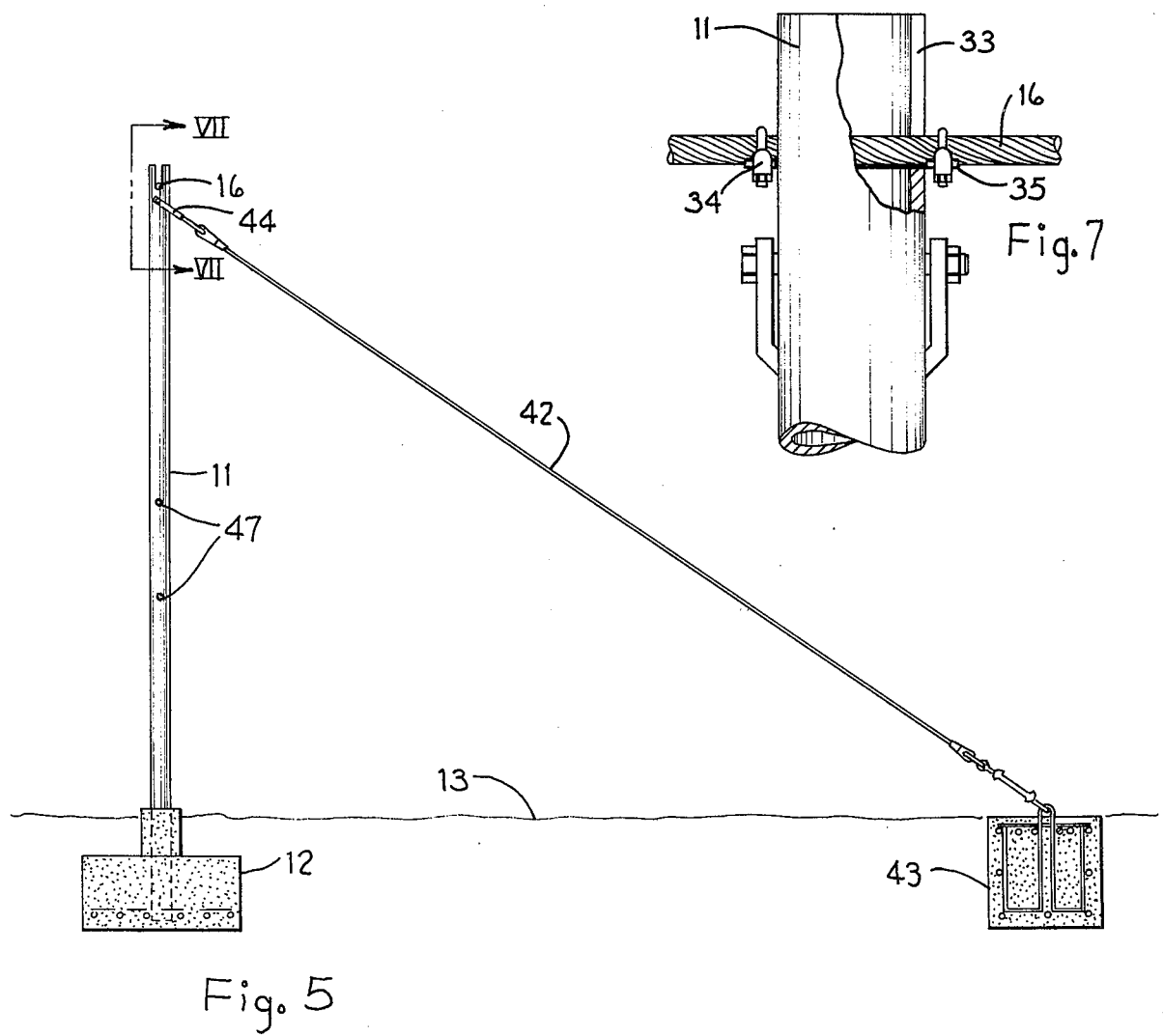

PLANT SHELTER

BACKGROUND OF THE INVENTION

This invention relates in general to a plant shelter and, more particularly, to a type thereof which can be readily and quickly adjusted to change the amount of sunlight or other light reaching the surface covered by the shelter, which utilizes materials that are inexpensive and readily available.

Persons acquainted with the problems of raising crops or plants which are sensitive to excessive sunlight, at least during portions of their growth and especially in regions where the radiation from the sun can become intense, have long recognized the need for a shelter which can adjustably restrict the amount of sunlight reaching said crops or plants. Many shelters have been developed and used for this purpose, but they have presented serious problems to their users. For example, many of the existing shelters have been fabricated from expensive materials and, therefore, have been wholly unsuited to use where large areas, such as 10 or more acres of ground, are involved. Moreover, said existing shelters have been difficult to assemble and/or adjust and often created serious obstructions to the movement of machinery and personnel through the area covered by such existing shelters. More specifically, where the shelter covers large plants, such as trees, or large crops, such as hybrid feed corn, it has been difficult at best to harvest, spray or perform other operations upon the plants or crops in the shelter. This has been largely due to obstruction by the existing shelter tops which have been difficult to move.

In addition to the foregoing, existing plant shelters have been such that it has been necessary, either because of the type of structure involved or because of the manpower required, to leave most of the shelter exposed to the weather during the substantial period between planting seasons.

Accordingly, a primary object of this invention is the provision of a plant shelter which utilizes relatively inexpensive and readily replaceable cover means which can be easily and inexpensively adjusted to control closely the amount of sunlight which reaches the plants under the shelter.

A further object of this invention is the provision of a plant shelter, as aforesaid, which is extremely sturdy in construction, and which includes cover support means that occupies a minimum amount of space on the ground and, therefore, which produces a minimum of obstruction to the movement of machinery and manpower through the area covered by the shelter.

A further object of this invention is the provision of a plant shelter, as aforesaid, having cover means which can be easily stored during the nonplanting season, thereby extending the useful life of said cover means by protecting it from unnecessary exposure to the elements.

Other objects and purposes of this invention will become apparent to persons familiar with this type of apparatus upon reading the following descriptive material and examining the accompanying drawings, in which:

FIG. 3 is an enlarged fragment of FIG. 2.

FIG. 5 is a sectional view taken along the line V—V in FIG. 1.

FIG. 7 is a sectional view taken along the line VII—VII in FIG. 5.

Figure 4:
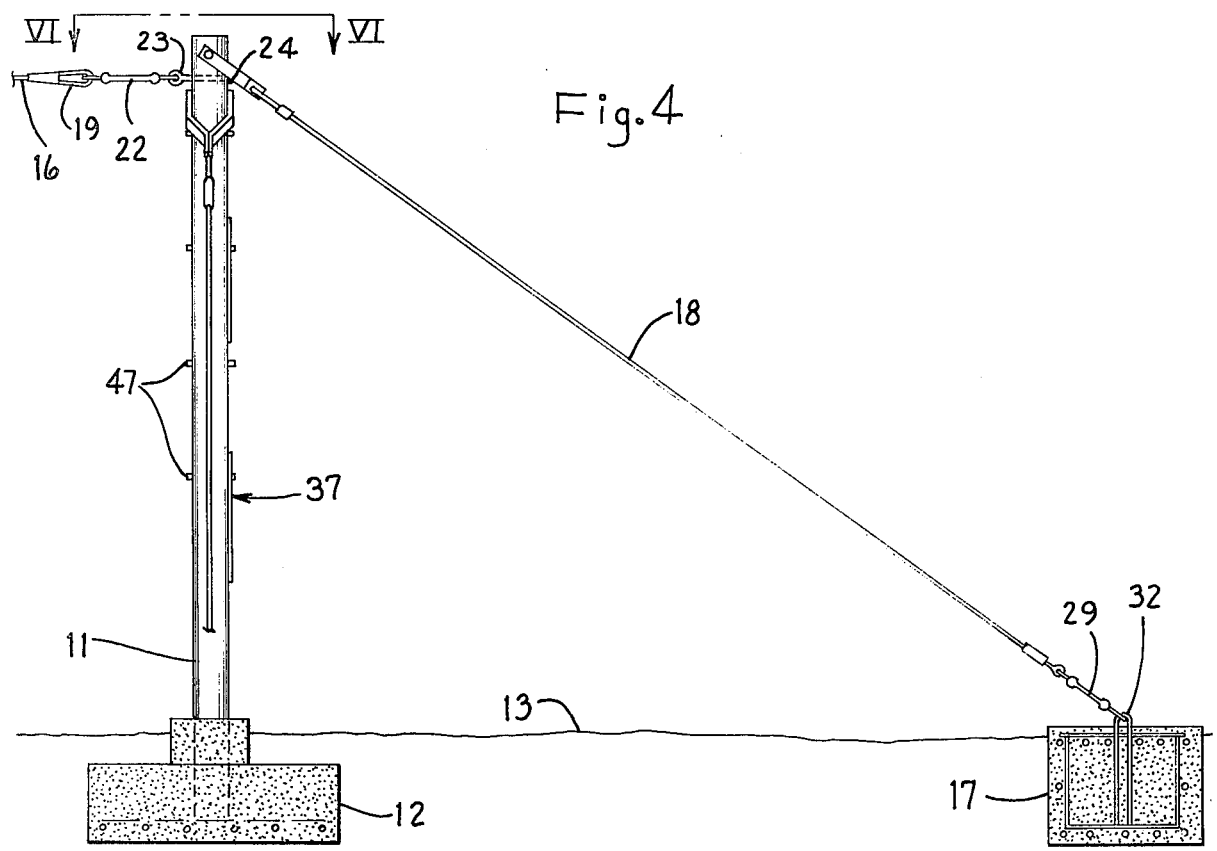
FIG. 4 is a sectional view taken along the line IV—IV in FIG. 1.

For convenience in description, the terms "upper", "lower", and words of similar import will have reference to the structure embodying the invention as appearing in FIGS. 4 and 5. The words "inner", "outer" and derivatives thereof will have reference to the geometric center of said shelter or components thereof.

SUMMARY OF THE INVENTION

The objects and the purposes of the invention, including those set forth above, have been met by providing a shelter composed of a plurality of upright posts anchored in a supporting surface, such as the ground, and arranged in aligned longitudinal and transverse rows. Preferably, the upright posts define a plurality of adjacent rectangles which are longitudinally and transversely aligned. The posts are connected at their upper ends to plural, parallel and spaced longitudinal wires, the opposite ends of which are connected to guy wires that are anchored in the ground. A plurality of spaced parallel transverse wires extend between and are secured to adjacent pairs of longitudinal wires. Plural elongated and substantially rigid elements are placed closely together and are held in spaced, parallel relationship by flexible means to form a long, flat cover member that can be rolled upon itself around an axis parallel with its elements for storage purposes. Each cover member is capable of spanning a pair of adjacent transverse wires with its elements resting upon said transverse wires whereby the cover member can be unrolled upon and along a pair of said transverse wires.

DETAILED DESCRIPTION

Figure 1:
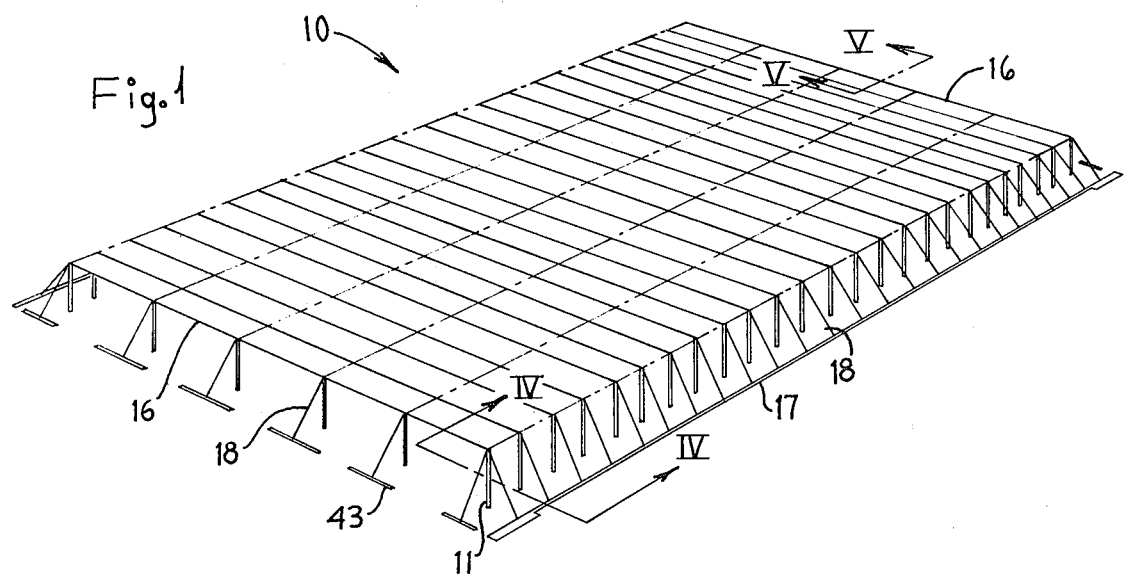
FIG. 1 is a perspective view of a plant shelter embodying my invention.
Figure 2:
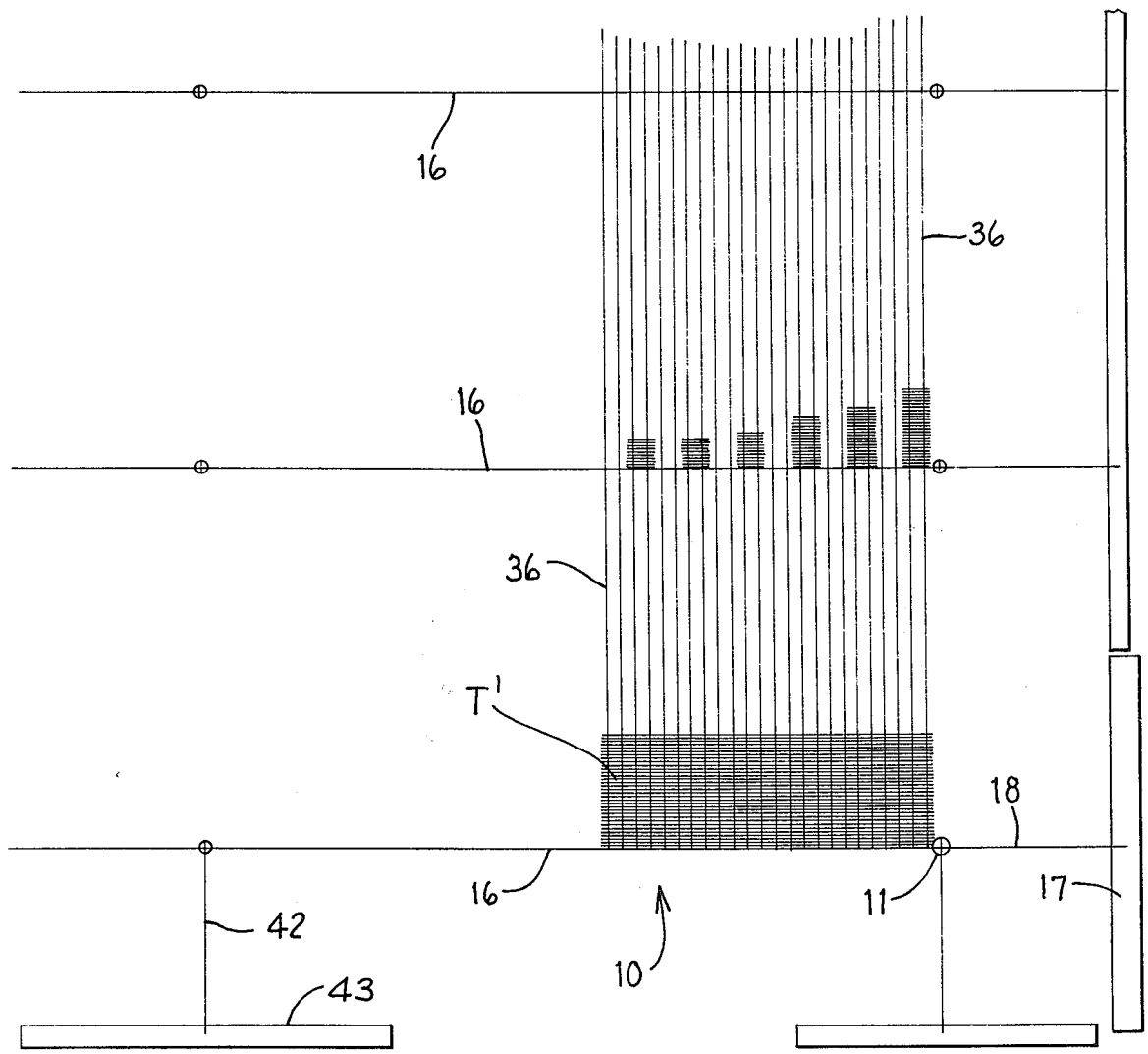
FIG. 2 is a top plan view of a fragment of said shelter near one corner thereof.

The shelter 10, a preferred embodiment of which is disclosed in FIG. 1, is comprised of a plurality of upright posts 11 (FIGS. 2 and 3), the lower ends of which are anchored in cement footings 12 which are disposed almost entirely below the surface 13 of the ground, an adjacent area of which is covered by the shelter 10. Referring to FIG. 2, which is an enlargement of the lowermost corner of FIG. 1, it will be seen that the posts 11 are connected near their upper ends to longitudinal wires or cables 16 which, under some circumstances, may be in excess of an inch in diameter. The cables 16 are parallel, preferably uniformly spaced and are anchored at opposite ends. For example, the longitudinal cable 16 (FIG. 2) is connected to a post 11 which is at one end of a line of posts. The post 11 is connected to the cable 18, which is anchored to the footing 17.

Figure 6:
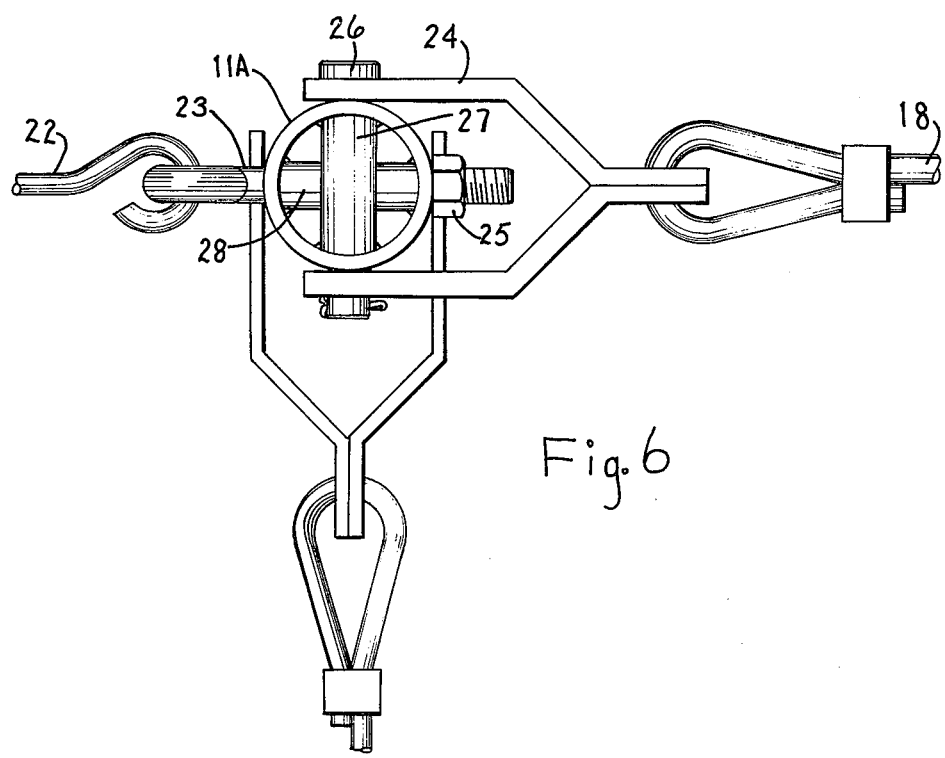
FIG. 6 is a sectional view taken along the line VI—VI in FIG. 4.

More specifically, and as shown in FIGS. 4 and 6, the longitudinal cable 16 is preferably provided with a loop 19 which is connected to a turnbuckle 22 which, in turn, is connected to the eye of an eyebolt 23 extending through the post 11. The eyebolt 23 extends through a sleeve 28 which is secured, as by welding, within the post 11. A clevis 24 is connected to the post 11 by a clevis pin 26 which extends through a sleeve 27 secured, as by welding, to the post 11 diametrically between the inner walls thereof. The clevis 24 is in turn connected to a loop on one end of the cable 18, the other end having a loop connected to the turnbuckle 29 which, in turn, is connected to a U-shaped anchor bracket 32, the lower portion of which is embedded in the footing 17.

FIG. 7 illustrates the connection between a post 11 and a longitudinal cable 16, where the post is intermediate the ends of the longitudinal cable 16 engaged thereby. Specifically, the post 11 has an upwardly opening slot 33 in the upper end thereof into which the cable 16 is slidably received. A pair of cable clamps 34 encircle the cable 16 on opposite sides of the post 11 and adjacent thereto for the purpose of preventing lengthwise movement of the cable 16 relative to the intermediate post 11.

The tautness of the cable 16 (FIG. 4), for example, can be adjusted by the nut 25 on the eyebolt 23 and by the turnbuckles 22 and 29. However, the turnbuckle 29 is usually used merely to maintain the post 11 in a vertical position.

The end posts, 11, in any given longitudinal or transverse line of posts, may be provided with small hooks or projections 47 (FIG. 4) for engaging the snow fencing wires 39 and thereby supporting lengths of snow fencing in a substantially vertical position upon said end posts. The posts may be of sufficient height that several horizontally extending rows of the snow fencing can be supported thereon. This vertically positioned fencing not only acts as a sun barrier, but can also act as a wind barrier, especially where relatively small and tender plants are being raised under the shelter.

A plurality of transverse wires 36 (FIG. 2) extend between, and are anchored (as by conventional cable clamps) at the opposite ends upon, a pair of adjacent longitudinal wires 16. In one particular embodiment, the spacing between the longitudinal wires 16 was 50 feet and the spacing between the transverse wires 36 was 2 feet. This spacing of the wires 36 permits the use of substantially conventional snow fencing 37 having slats or elongated elements 38 which are approximately 4 feet long. The slats 38 are interconnected by wires 39 which are interwoven with the slats so as to leave a small space between each pair of adjacent and parallel slats. As shown in FIG. 3, the slats extend transversely of the transverse wires 36 and the snow fencing may be arranged so that it almost completely covers the ground below the shelter top, with only a small amount of light passing between the slats as shown at T' in FIG. 2. On the other hand, the slats can cover two transverse wires, skip one transverse wire and then cover the fourth and fifth wires, as shown in FIG. 3. The placement of the fencing 37 will depend upon how much light should be permitted to reach the ground within the boundries of the shelter.

Because of the tension which must be applied to the transverse wires 36 in order to support the snow fencing, the posts 11 at the opposite ends of each transverse row thereof must be anchored by means of cables 42 in the footings 43. Specifically, as shown in FIG. 5, the clevis 44 is pivotally secured to the end post 11 and also to the upper end of a cable 42. The lower end of cable 42 is connected to the footing 43 in much the same manner as described above with respect to the connection of the lower end of the cable 18 to the footing 17.

I-shaped strips 35 are preferably disposed in the slots 33 beneath the cables 16 and between the cable clamps 34 to protect the cables 16.

OPERATION

Although the operation of the shelter will be apparent to persons familiar with this type of equipment upon reading the foregoing description, such operation will be briefly summarized hereinafter for convenience.

After the shelter 10 has been installed as it appears in FIG. 1, or in some fragment or enlargement thereof, the planting within the zone defined can be commenced with little or no interference from the posts 11 which support the shelter top. In some instances, the shelter may be installed after the planting has occurred but with the same results of little or no interference from the posts with the plantings, if only because the adjacent posts are 50 feet from each other at the closest distance in this particular embodiment.

Some adjustment of the tension in the longitudinal cables 16, in particular, may be required in order to minimize the amount of drape therein between posts. This, of course, is accomplished by means of the turnbuckles 22 (FIG. 4) and the eyebolts 23 (FIG. 6). Similar adjustments may be required transversely of the longitudinal wires in a similar manner.

The amount of sunlight which should be permitted to reach the ground within the zone of the shelter is now determined. By appropriately placing the snow fencing 37 upon the transverse wires 36, an almost infinite variation in the amount of light or sun's radiation reaching the ground can be effected. Moreover, it may be desirable to cover only a portion of the zone within the shelter periphery and, of course, this can be accomplished by selecting the transverse wires which should carry the snow fencing, and then leaving uncovered wires therebetween.

When it becomes desirable to terminate the use of the shelter for the planting season, this can be accomplished by merely rolling the snow fencing upon itself and then storing same in stacks of rolls alongside of the shelter. In fact, that same snow fencing may serve the dual purpose of an actual snow fence during the winter months while it serves as part of the shelter 10 in the summer months.

It follows from the foregoing that the fencing 37 can serve as an obstruction not only to light, but also to wind, inclement weather and even animals or large birds.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A shelter for controlling the amount of light reaching a relatively large surface in which or upon which living plants or the like are to be raised, the combination comprising:

a plurality of stationary posts projecting upwardly from said surface and arranged in longitudinal and transverse rows along said surface;

a plurality of parallel, longitudinal cables connected to the upper ends of said posts in said longitudinal rows, each said longitudinal cable being connected to the posts of one of said longitudinal rows;

each post located intermediate the ends of said longitudinal rows having an upwardly opening slot formed in the upper end thereof, said slot extending across said post in the longitudinal direction of said longitudinal cable for accommodating an intermediate portion of said longitudinal cable therein;

a pair of clamp means fixed to the intermediate portion of said longitudinal cable and positioned directly adjacent the opposite sides of each slotted post, said clamp means being larger than the width of the slot for engaging the post to prevent longitudinal movement of said longitudinal cable relative to said intermediate post;

anchor cable means extending between the endmost posts of said longitudinal rows and said surface;

a plurality of parallel, transverse wires extending between and connected to pairs of said longitudinal cables, said transverse wires being uniformly spaced longitudinally of said longitudinal cables with the spacing between adjacent transverse wires being substantially less than the spacing between adjacent posts located in said longitudinal rows so that several of said transverse wires are positioned between said adjacent posts; and cover means supported on said transverse wires and removable for permitting a selectively controlled amount of light to pass therethrough, said cover means including a plurality of elongated slatlike elements of substantially uniform length, said elements being removably supported on said transverse wires and positioned so that they extend perpendicularly between a pair of adjacent transverse wires;

said cover means also including wirelike flexible means interconnecting said slatlike elements at uniform spaced intervals and in parallel arrangement for permitting said slatlike elements and flexible means to be formed into a roll for storage purposes, said flexible means resulting in elongated narrow openings between adjacent slatlike elements whereby a controlled amount of light can pass through said narrow openings, said slatlike elements having a length greater than the spacing between an adjacent pair of transverse wires so that a roll of said slatlike elements and flexible means can be unrolled upon and along a pair of adjacent transverse wires to provide a plant cover;

said cover means including a plurality of said rolls of slatlike elements and flexible means, said rolls being individually positionable on and freely removable from said transverse wires, whereby the number of rolls positioned on said transverse wires and the spacing between said rolls permits selective control over the amount of light permitted to reach the surface located below the shelter.

2. A shelter for controlling the amount of light reaching a relatively large surface in which or upon which living plants or the like are to be raised, the combination comprising:

a plurality of stationary posts projecting upwardly from said surface and arranged in longitudinal and transverse rows along said surface, the adjacent posts being longitudinally spaced approximately 100 feet apart;

a plurality of parallel, longitudinal cables connected to the upper ends of said posts in said longitudinal rows, each said longitudinal cable being connected to the posts of one of said longitudinal rows, the adjacent longitudinal cables being spaced approximately 50 feet apart;

anchor cable means extending between the endmost posts of said longitudinal rows and said surface;

a plurality of parallel, transverse wires extending between and connected to pairs of said longitudinal cables, said transverse wires being uniformly spaced longitudinally of said longitudinal cables with the spacing between adjacent transverse wires being substantially less than the spacing between adjacent posts located in said longitudinal rows so that several of said transverse wires are positioned between said adjacent posts, the adjacent transverse wires being spaced approximately two feet apart;

cover means supported on said transverse wires and removable for permitting a selectively controlled amount of light to pass therethrough, said cover means including a plurality of elongated slatlike elements of substantially uniform length, said elements being removably supported on said transverse wires and positioned so that they extend perpendicularly between a pair of adjacent transverse wires;

said cover means also including wirelike flexible means interconnecting said slatlike elements at uniform spaced intervals and in parallel arrangement for permitting said slatlike elements and flexible means to be formed into a roll for storage purposes, said flexible means resulting in elongated narrow openings between adjacent slatlike elements whereby a controlled amount of light can pass through said narrow openings, said slatlike elements having a length greater than the spacing between an adjacent pair of transverse wires so that a roll of said slatlike elements and flexible means can be unrolled upon and along a pair of adjacent transverse wires to provide a plant cover;

said cover means including a plurality of said rolls of slatlike elements and flexible means, said rolls being individually positionable on and freely removable from said transverse wires, whereby the number of rolls positioned on said transverse wires and the spacing between said rolls permits selective control over the amount of light permitted to reach the surface located below the shelter; and projection means on the upright posts located at the ends of the transverse and longitudinal rows for engaging and supporting at least one of the rolls of said cover means so that the unrolled roll extends horizontally across the end posts with the individual slatlike elements extending in a substantially vertical direction, said projection means engaging the wirelike flexible means of the roll when it is in an unrolled condition so that said unrolled roll extends horizontally along and is supported on a plurality of said end posts.

* * * * *